(12) United States Patent
Sunnarborg et al.

(10) Patent No.: US 11,181,004 B2
(45) Date of Patent: Nov. 23, 2021

(54) CONFINEMENT OF A ROPE SEAL ABOUT A PASSAGE USING A BACKING PLATE

(71) Applicant: United Technologies Corporation, Farmington, CT (US)

(72) Inventors: Amy M. Sunnarborg, Jupiter, FL (US); Brendan J. Dugan, Weatogue, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 104 days.

(21) Appl. No.: 16/785,204

(22) Filed: Feb. 7, 2020

(65) Prior Publication Data
US 2021/0246804 A1  Aug. 12, 2021

(51) Int. Cl.
| | | |
|---|---|---|
| *F01D 11/00* | (2006.01) | |
| *F16J 15/02* | (2006.01) | |
| *F16J 15/08* | (2006.01) | |
| *F16J 15/10* | (2006.01) | |

(52) U.S. Cl.
CPC ........... *F01D 11/005* (2013.01); *F16J 15/022* (2013.01); *F16J 15/028* (2013.01); *F16J 15/0812* (2013.01); *F16J 15/0887* (2013.01); *F16J 15/104* (2013.01); *F05D 2220/32* (2013.01); *F05D 2240/55* (2013.01)

(58) Field of Classification Search
CPC .............. F01D 11/005; F05D 2220/32; F05D 2240/55; F16J 15/022; F16J 15/028; F16J 15/0812; F16J 15/0887; F16J 15/104
See application file for complete search history.

(56) References Cited

U.S. PATENT DOCUMENTS

| | | | | | |
|---|---|---|---|---|---|
| 4,477,093 | A | * | 10/1984 | Adamek ................. | E21B 33/03 277/322 |
| 4,534,570 | A | * | 8/1985 | Munde ................... | F16J 15/022 277/399 |
| 4,572,518 | A | * | 2/1986 | Spargo ................. | B63H 23/321 277/580 |
| 4,889,319 | A | * | 12/1989 | Phillips .................. | C30B 23/02 251/368 |
| 5,071,140 | A | * | 12/1991 | Quevedo del Rio ..... | F16L 7/02 277/608 |

(Continued)

*Primary Examiner* — Justin D Seabe
*Assistant Examiner* — Theodore C Ribadeneyra
(74) *Attorney, Agent, or Firm* — Cantor Colburn LLP

(57) ABSTRACT

A pass through passage assembly of a gas turbine engine includes a compartment wall located between a first compartment and a second compartment, and a wall opening in the compartment wall connecting the first compartment and the second compartment, the wall opening having a central axis. A passage insert extends from the first compartment to the second compartment. A seal plate is positioned at the second compartment and extends about the central axis such that the compartment wall is located between an insert flange and the seal plate. A backing plate is positioned and retained between seal plate and the compartment wall, with the seal plate, the backing plate, the compartment wall, and the passage insert defining a seal cavity therebetween. A rope seal is located in the seal cavity and is retained in the seal cavity by the backing plate, the seal plate and the passage insert.

20 Claims, 3 Drawing Sheets

(56) References Cited

U.S. PATENT DOCUMENTS

| | | | |
|---|---|---|---|
| 8,047,773 B2* | 11/2011 | Bruce | F01D 25/04 |
| | | | 415/173.3 |
| 9,587,502 B2 | 3/2017 | Davis et al. | |
| 9,988,919 B2 | 6/2018 | Davis et al. | |
| 10,100,654 B2 | 10/2018 | Vetters et al. | |
| 10,125,903 B1* | 11/2018 | Doran | F16L 19/0212 |
| 10,337,275 B1* | 7/2019 | Miller | E21B 33/1208 |
| 2009/0072494 A1* | 3/2009 | Smith | F16L 25/14 |
| | | | 277/625 |
| 2009/0155071 A1* | 6/2009 | Lescure | F01D 25/30 |
| | | | 415/214.1 |
| 2011/0070078 A1* | 3/2011 | Paprotna | F01D 11/005 |
| | | | 415/214.1 |
| 2013/0187346 A1* | 7/2013 | Beagen, Jr. | F16L 21/065 |
| | | | 277/626 |
| 2013/0333554 A1* | 12/2013 | Holtgraver | F16J 1/005 |
| | | | 92/165 R |
| 2014/0000258 A1* | 1/2014 | Nishimoto | F01K 21/00 |
| | | | 60/643 |
| 2014/0123647 A1* | 5/2014 | Nakazawa | F01D 9/06 |
| | | | 60/657 |
| 2014/0138385 A1* | 5/2014 | Wolf | B60K 15/0406 |
| | | | 220/378 |
| 2014/0312572 A1* | 10/2014 | Shionoya | B29C 43/003 |
| | | | 277/608 |
| 2015/0171598 A1* | 6/2015 | Suzuki | F16J 15/0806 |
| | | | 277/650 |
| 2015/0192062 A1* | 7/2015 | Tschirschke | F02B 37/183 |
| | | | 415/145 |
| 2015/0200531 A1* | 7/2015 | Chiu | F16J 15/022 |
| | | | 277/607 |
| 2015/0233295 A1* | 8/2015 | Farah | F02C 7/12 |
| | | | 60/772 |
| 2015/0260057 A1* | 9/2015 | Farah | F01D 25/162 |
| | | | 60/796 |
| 2015/0260317 A1* | 9/2015 | Yamamoto | F16L 23/18 |
| | | | 277/609 |
| 2016/0061047 A1 | 3/2016 | Davis et al. | |
| 2016/0114715 A1* | 4/2016 | Newhouse | B60J 10/00 |
| | | | 277/642 |
| 2016/0177764 A1* | 6/2016 | Lemoine | F01D 25/162 |
| | | | 277/313 |
| 2016/0208969 A1* | 7/2016 | Bertoni | F16L 23/18 |
| 2016/0327082 A1* | 11/2016 | Phillips | F01D 1/00 |
| 2016/0341313 A1* | 11/2016 | Jayapalan | F16J 15/022 |
| 2017/0051831 A1* | 2/2017 | Haley | F16J 15/065 |
| 2017/0089467 A1* | 3/2017 | Young | F01D 25/183 |
| 2017/0191335 A1* | 7/2017 | Nguyen | E21B 23/006 |
| 2017/0204737 A1* | 7/2017 | Varney | F01D 11/005 |
| 2017/0204789 A1* | 7/2017 | Gallet | F02C 9/52 |
| 2017/0276355 A1* | 9/2017 | Sander | F01D 25/246 |
| 2017/0292702 A1* | 10/2017 | Sander | F23R 3/002 |
| 2017/0342849 A1* | 11/2017 | Rice | F01D 11/005 |
| 2018/0051591 A1* | 2/2018 | Quennehen | F01D 11/005 |
| 2018/0149031 A1* | 5/2018 | Sippel | F01D 25/246 |
| 2018/0355746 A1* | 12/2018 | Barra | F02C 7/047 |
| 2019/0071996 A1* | 3/2019 | Schmidt | F01D 11/005 |
| 2019/0170253 A1* | 6/2019 | Binder | H01R 13/5202 |

* cited by examiner

CONFINEMENT OF A ROPE SEAL ABOUT A PASSAGE USING A BACKING PLATE

STATEMENT OF FEDERAL SUPPORT

This invention was made with Government support awarded by the United States. The Government has certain rights in the invention.

BACKGROUND

Exemplary embodiments of the present disclosure pertain to the art of sealing about passages, and in particular to the utilization of rope seals.

Rope seals are often utilized to provide sealing where a component extends through a passageway from a first compartment or space to a second compartment or space. The seal is configured to prevent flow conditions in the first compartment from reaching the second compartment, and vice-versa.

Given space restrictions, an actuator must pass through a flow area cavity to a different cavity. In order to optimize engine efficiency, leakage at this passageway location must be prevented as much as possible. The seal must be durable and be able to handle extremely high temperatures. In a typical rope seal arrangement, a location of the rope seal deflects or "walks" during operation of the gas turbine engine due to thermal effects and other conditions. This deflection of the rope seal compromises the sealing condition and allows leakage at the passageway.

BRIEF DESCRIPTION

In one embodiment, a pass through passage assembly of a gas turbine engine includes a compartment wall located between a first compartment and a second compartment, and a wall opening in the compartment wall connecting the first compartment and the second compartment, the wall opening having a central axis. A passage insert is located in the wall opening and extends about the central axis and from the first compartment to the second compartment. The passage insert includes an insert flange located at the first compartment and abutting the compartment wall. A seal plate is positioned at the second compartment and extends about the central axis such that the compartment wall is located between the insert flange and the seal plate. A backing plate is located at the second compartment and extends about the central axis. The backing plate is positioned and retained between seal plate and the compartment wall, with the seal plate, the backing plate, the compartment wall, and the passage insert defining a seal cavity therebetween. A rope seal is located in the seal cavity and extends about the central axis. The rope seal is retained in the seal cavity by the backing plate, the seal plate and the passage insert.

Additionally or alternatively, in this or other embodiments a radially inner surface of the seal plate relative to the central axis abuts a radial outer surface of the passage insert.

Additionally or alternatively, in this or other embodiments the passage insert, the backing plate and the seal plate are secured to the compartment wall.

Additionally or alternatively, in this or other embodiments the passage insert, the backing plate and the seal plate are secured to the compartment wall via a plurality of mechanical fasteners extending therethrough.

Additionally or alternatively, in this or other embodiments the seal plate includes a chamfer in the seal cavity to radially retain the rope seal.

Additionally or alternatively, in this or other embodiments the rope seal is secured in the seal cavity via an adhesive.

Additionally or alternatively, in this or other embodiments the backing plate is a ring.

In another embodiment, an actuator arrangement of a gas turbine engine includes a compartment wall located between a first compartment and a second compartment, and a wall opening in the compartment wall connecting the first compartment and the second compartment, the wall opening having a central axis. A passage insert is located in the wall opening and extends about the central axis and from the first compartment to the second compartment. The passage insert includes an insert flange located at the first compartment and abutting the compartment wall, the passage insert defining a passage therethrough extending between the first compartment and the second compartment. An actuator extends through the passage. A seal plate is located at the second compartment and extends about the central axis such that the compartment wall is located between the insert flange and the seal plate. A backing plate is located at the second compartment and extends about the central axis. The backing plate is positioned and retained between seal plate and the compartment wall, with the seal plate, the backing plate, the compartment wall, and the passage insert defining a seal cavity therebetween. A rope seal is positioned in the seal cavity and extends about the central axis. The rope seal is retained in the seal cavity by the backing plate, the seal plate and the passage insert.

Additionally or alternatively, in this or other embodiments a radially inner surface of the seal plate relative to the central axis abuts a radial outer surface of the passage insert.

Additionally or alternatively, in this or other embodiments the passage insert, the backing plate and the seal plate are secured to the compartment wall.

Additionally or alternatively, in this or other embodiments the passage insert, the backing plate and the seal plate are secured to the compartment wall via a plurality of mechanical fasteners extending therethrough.

Additionally or alternatively, in this or other embodiments the seal plate includes a chamfer in the seal cavity to radially retain the rope seal.

Additionally or alternatively, in this or other embodiments the rope seal is secured in the seal cavity via an adhesive.

Additionally or alternatively, in this or other embodiments the backing plate is a ring.

In another embodiment, a gas turbine engine includes a combustor, a turbine driven by combustion gases output from the combustor, and a pass through passage assembly. The pass through passage assembly includes a compartment wall located between a first compartment and a second compartment, and a wall opening in the compartment wall connecting the first compartment and the second compartment, the wall opening having a central axis. A passage insert is located in the wall opening and extends about the central axis and from the first compartment to the second compartment, the passage insert including an insert flange disposed at the first compartment and abutting the compartment wall. A seal plate is located at the second compartment and extends about the central axis such that the compartment wall is located between the insert flange and the seal plate. A backing plate is located at the second compartment and extends about the central axis. The backing plate positioned and retained between seal plate and the compartment wall, with the seal plate, the backing plate, the compartment wall, and the passage insert defining a seal cavity therebetween. A rope seal is located in the seal cavity and extends about the central axis. The rope seal is retained in the seal cavity by the backing plate, the seal plate and the passage insert.

Additionally or alternatively, in this or other embodiments a radially inner surface of the seal plate relative to the central axis abuts a radial outer surface of the passage insert.

Additionally or alternatively, in this or other embodiments the passage insert, the backing plate and the seal plate are secured to the compartment wall.

Additionally or alternatively, in this or other embodiments the passage insert, the backing plate and the seal plate are secured to the compartment wall via a plurality of mechanical fasteners extending therethrough.

Additionally or alternatively, in this or other embodiments the seal plate includes a chamfer in the seal cavity to radially retain the rope seal.

Additionally or alternatively, in this or other embodiments the rope seal is secured in the seal cavity via an adhesive.

Additionally or alternatively, in this or other embodiments the backing plate is a ring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
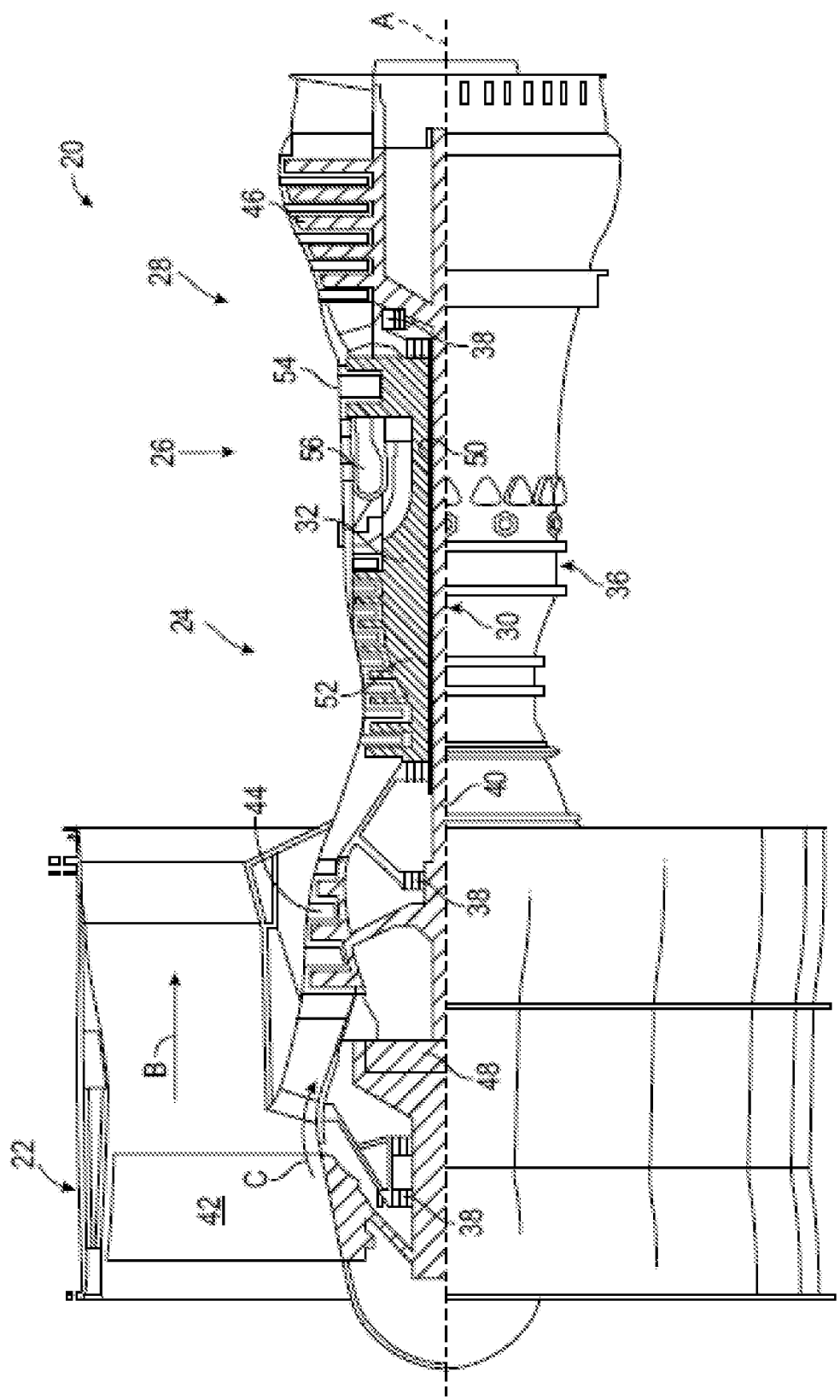
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

Figure 2:
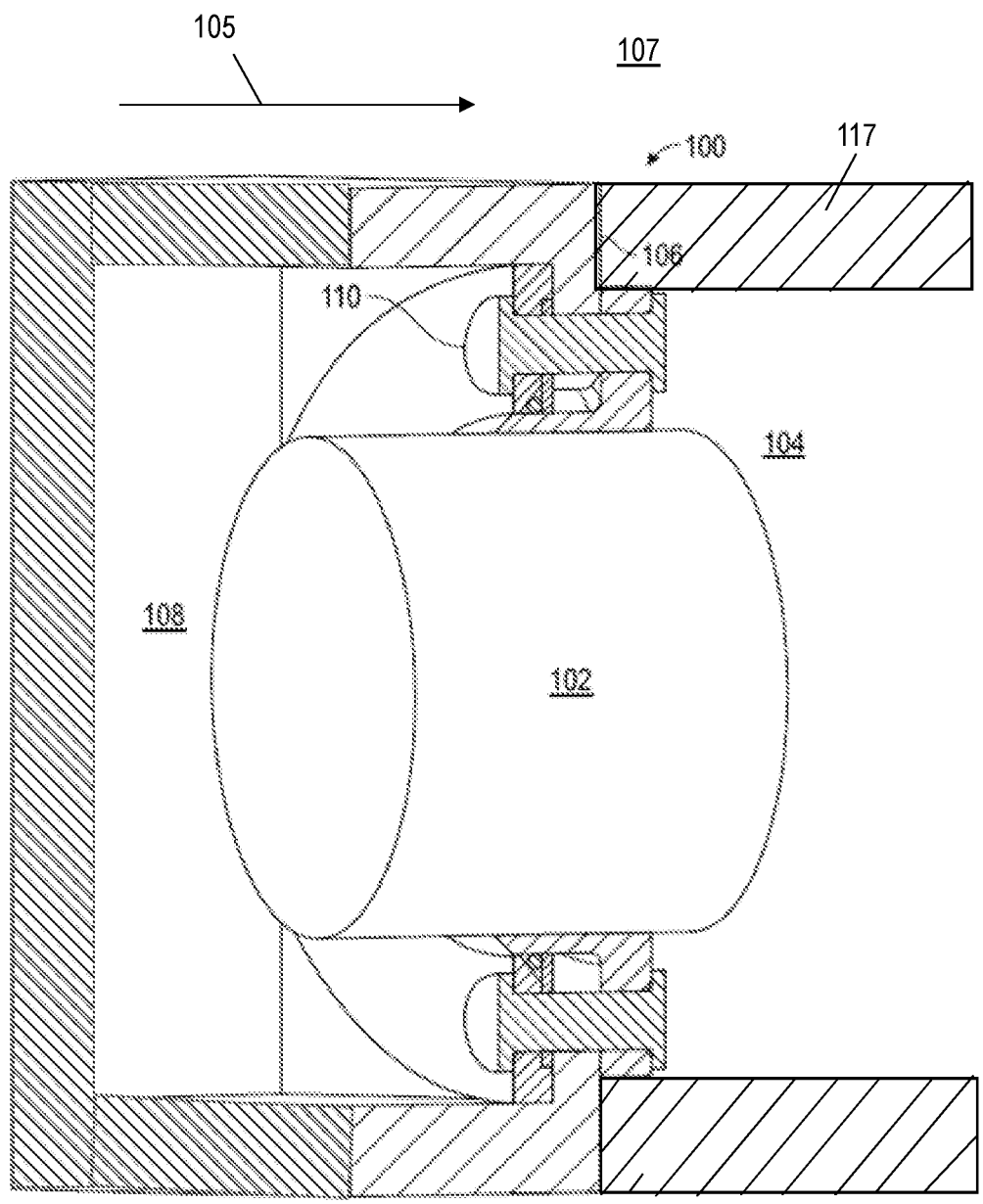
FIG. 2 is a partial perspective view of an embodiment of a pass-through opening of a gas turbine engine.

Referring now to the perspective view of FIG. 2, the gas turbine engine 20 includes one or more pass-through openings or passages 100. The passages 100 are utilized in the gas turbine engine 20 as a passage for components, such as an actuator 102 schematically shown in FIG. 2 to extend from a first compartment 104 at a first passage end 106 to a second compartment 108 at a second passage end 110. While an actuator 102 is shown in FIG. 2, one skilled in the art will readily appreciate other components such as electrical wiring, piping or the like may extend through the passage 100.

Figure 3:
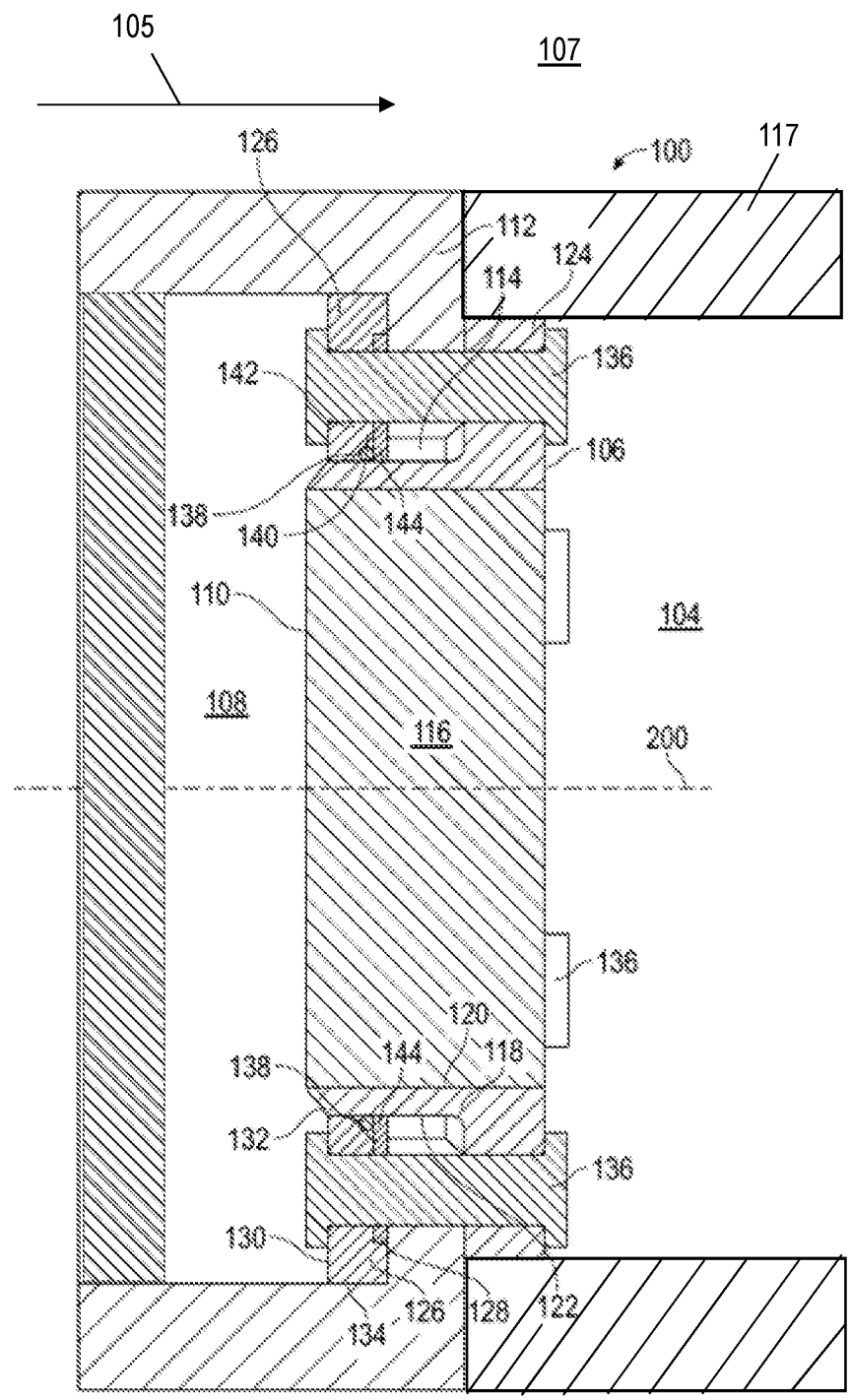
FIG. 3 is a cross-sectional view of an embodiment of a pass-through opening of a gas turbine engine.

It is desired to restrict leakage of airflow from outside of the first compartment 104 and the second compartments 108 into the first compartment 104 and/or the second compartment 108. In some embodiments, a leakage airflow 105 is from, for example, a third compartment 107 outside of the first compartment 104 and the second compartment 108. In other embodiments, the leakage airflow 105 may be from a free space outside of the first compartment 104 and the second compartment 108. Referring to the cross-sectional view of FIG. 3, the structure of an embodiment of the passage 100 will be described in greater detail. The first compartment 104 and the second compartment 108 are generally separated by a first compartment wall 112. At a selected location, a wall opening 114 is located in the first compartment wall 112. The wall opening 114 has a central axis 200. In some embodiments, the passage 100 is defined by a passage insert 116 located in the wall opening 114 and extending through the first compartment wall 112. In some embodiments, the passage insert 116 is a portion of a second compartment wall 117 that extends into the wall opening 114. The passage insert 116 includes an insert wall 118 extending through the wall opening 114 having a wall inner surface 120 and a wall outer surface 122. The insert wall 118 extends about the central axis 200. The wall inner surface 120 defines an internal boundary of the passage 100. In some embodiments, the passage insert 116 includes an insert flange 124 extending from the insert wall 118. The insert flange 124 abuts the first compartment wall 112. In some embodiments, the wall opening 114 and/or the inner wall surface 120 have circular cross-sections about the central axis 200, such that the internal boundary of the passage 100 is circular in cross-section. In other embodiments, other shapes may be utilized, so that the internal boundary of the passage 100 has, for example, an oval, elliptical or other shape, which may be curvilinear, polygonal or a combination of curvilinear and polygonal.

A seal plate 126 is located at the second compartment such that the first compartment wall 112 at the wall opening 114 is located between the insert flange 124 and the seal plate 126. In some embodiments the seal plate 126 is ring-shaped about the central axis 200, having a first plate surface 128 abutting the first compartment wall 112, a second plate surface 130 opposite the first plate surface 128, an inner radial surface 132 abutting the wall outer surface 122 of the passage insert 116, and an outer radial surface 134 opposite the inner radial surface 132. The seal plate 126 and the passage insert 116 are secured to the first compartment wall 112 via a plurality of mechanical fasteners, for example, bolts 136 extending through the insert flange 124, the compartment wall and the seal plate 126.

A rope seal 138 extends circumferentially around the passage 100 relative to the central axis 200 in a seal cavity 140 defined by the wall outer surface 122 and the first plate surface 128, in particular a chamfer 142 of the seal plate 126, the insert flange 124 and the wall opening 114. The rope seal 138 prevents leakage flow from passing through the seal cavity 140 from the first compartment 104 to the second compartment 108, or from the second compartment 108 to the first compartment 104. In some embodiments, the chamfer 142 on the first plate surface 128 retains the rope seal 138 in a radial direction and in a first axial direction at the seal plate 126. In some embodiments, the ring seal 138 is a full ring, while in other embodiments the ring seal 138 may be a single piece with a first end and a second end, or further may include two or more ring seal segments.

A backing plate 144 is located between the seal plate 126 and the first compartment wall 112 and is secured between the seal plate 126 and the component wall 112 by the bolts 136. The rope seal 138 is located between the backing plate 144 and the chamfer 142 of the seal plate 126, such that the backing plate 144 and the seal plate 126 fully axially retain the rope seal 138. The rope seal 138 is radially retained between the wall outer surface 122 and the chamfer 142 of the first plate surface 128. In some embodiments, the rope seal 138 is installed utilizing an adhesive to hold the rope seal 138 in position until the backing plate 144 and the seal plate 126 are installed to retain the rope seal 138. During operation of the gas turbine engine 20, the temperature of operation will burn off the adhesive.

Inclusion of the backing plate 144 and seal plate 126 axially and radially restrains the rope seal 138 and prevents movement of the rope seal 138, thereby preventing a loss of seal integrity and an increase in leakage from outside of the first compartment 104 and the second compartment 108 into the first compartment 104 and/or the second compartment 108.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pass through passage assembly of a gas turbine engine, comprising:
   a compartment wall disposed between a first compartment and a second compartment;

a wall opening in the compartment wall connecting the first compartment and the second compartment, the wall opening having a central axis;

a passage insert disposed in the wall opening and extending about the central axis and from the first compartment to the second compartment, the passage insert including an insert flange disposed at the first compartment and abutting the compartment wall;

a seal plate disposed at the second compartment and extending about the central axis such that the compartment wall is disposed between the insert flange and the seal plate;

a backing plate disposed at the second compartment and extending about the central axis, the backing plate disposed and retained between seal plate and the compartment wall, with the seal plate, the backing plate, the compartment wall, and the passage insert defining a seal cavity therebetween; and a rope seal disposed in the seal cavity and extending about the central axis, the rope seal retained in the seal cavity by the backing plate, the seal plate and the passage insert.

2. The pass through passage assembly of claim 1, wherein a radially inner surface of the seal plate relative to the central axis abuts a radial outer surface of the passage insert.

3. The pass through passage assembly of claim 1, wherein the passage insert, the backing plate and the seal plate are secured to the compartment wall.

4. The pass through passage assembly of claim 3, wherein the passage insert, the backing plate and the seal plate are secured to the compartment wall via a plurality of mechanical fasteners extending therethrough.

5. The pass through passage assembly of claim 1, wherein the seal plate includes a chamfer in the seal cavity to radially retain the rope seal.

6. The pass through passage assembly of claim 1, wherein the rope seal is secured in the seal cavity via an adhesive.

7. The pass through passage assembly of claim 1, wherein the backing plate is a ring.

8. An actuator arrangement of a gas turbine engine, comprising:

a compartment wall disposed between a first compartment and a second compartment;

a wall opening in the compartment wall connecting the first compartment and the second compartment, the wall opening having a central axis;

a passage insert disposed in the wall opening and extending about the central axis and from the first compartment to the second compartment, the passage insert including an insert flange disposed at the first compartment and abutting the compartment wall, the passage insert defining a passage therethrough extending between the first compartment and the second compartment;

an actuator extending through the passage;

a seal plate disposed at the second compartment and extending about the central axis such that the compartment wall is disposed between the insert flange and the seal plate;

a backing plate disposed at the second compartment and extending about the central axis, the backing plate disposed and retained between seal plate and the compartment wall, with the seal plate, the backing plate, the compartment wall, and the passage insert defining a seal cavity therebetween; and a rope seal disposed in the seal cavity and extending about the central axis, the rope seal retained in the seal cavity by the backing plate, the seal plate and the passage insert.

9. The actuator arrangement of claim 8, wherein a radially inner surface of the seal plate relative to the central axis abuts a radial outer surface of the passage insert.

10. The actuator arrangement of claim 8, wherein the passage insert, the backing plate and the seal plate are secured to the compartment wall.

11. The actuator arrangement of claim 10, wherein the passage insert, the backing plate and the seal plate are secured to the compartment wall via a plurality of mechanical fasteners extending therethrough.

12. The actuator arrangement of claim 8, wherein the seal plate includes a chamfer in the seal cavity to radially retain the rope seal.

13. The actuator arrangement of claim 8, wherein the rope seal is secured in the seal cavity via an adhesive.

14. The actuator arrangement of claim 8, wherein the backing plate is a ring.

15. A gas turbine engine, comprising:

a combustor;

a turbine driven by combustion gases output from the combustor; and a pass through passage assembly including:

a compartment wall disposed between a first compartment and a second compartment;

a wall opening in the compartment wall connecting the first compartment and the second compartment, the wall opening having a central axis;

a passage insert disposed in the wall opening and extending about the central axis and from the first compartment to the second compartment, the passage insert including an insert flange disposed at the first compartment and abutting the compartment wall;

a seal plate disposed at the second compartment and extending about the central axis such that the compartment wall is disposed between the insert flange and the seal plate;

a backing plate disposed at the second compartment and extending about the central axis, the backing plate disposed and retained between seal plate and the compartment wall, with the seal plate, the backing plate, the compartment wall, and the passage insert defining a seal cavity therebetween; and a rope seal disposed in the seal cavity and extending about the central axis, the rope seal retained in the seal cavity by the backing plate, the seal plate and the passage insert.

16. The gas turbine engine of claim 15, wherein a radially inner surface of the seal plate relative to the central axis abuts a radial outer surface of the passage insert.

17. The gas turbine engine of claim 15, wherein the passage insert, the backing plate and the seal plate are secured to the compartment wall.

18. The gas turbine engine of claim 17, wherein the passage insert, the backing plate and the seal plate are secured to the compartment wall via a plurality of mechanical fasteners extending therethrough.

19. The gas turbine engine of claim 15, wherein the seal plate includes a chamfer in the seal cavity to radially retain the rope seal.

20. The gas turbine engine of claim 15, wherein the rope seal is secured in the seal cavity via an adhesive.

\* \* \* \* \*